United States Patent [19]

Shih et al.

[11] Patent Number: 5,113,114

[45] Date of Patent: May 12, 1992

[54] MULTILAM OR BELLEVILLE SPRING CONTACT FOR RETAINING RINGS ON DYNAMOELECTRIC MACHINE

[75] Inventors: True T. Shih, Schenectady; Manoj R. Shah, Albany; James B. Archibald, Schenectady, all of N.Y.

[73] Assignee: General Electric Company, Schenectady, N.Y.

[21] Appl. No.: 628,900

[22] Filed: Dec. 18, 1990

[51] Int. Cl.$^5$ ............................................. H02K 3/46
[52] U.S. Cl. .................................. 310/270; 310/214; 310/261
[58] Field of Search ............... 310/261, 260, 262, 214, 310/215, 217, 270, 105, 42, 198; 336/197

[56] References Cited

U.S. PATENT DOCUMENTS

| | | | |
|---|---|---|---|
| 2,773,210 | 12/1956 | Vogt | 310/270 |
| 2,960,360 | 11/1960 | Taylor | 287/103 |
| 3,324,324 | 6/1967 | Richardson et al. | 310/214 |
| 3,453,587 | 7/1969 | Neidecker | 339/256 |
| 3,476,966 | 11/1969 | Willyoung | 310/270 |
| 3,614,498 | 10/1971 | Bank | 310/262 |
| 4,177,398 | 12/1979 | Zagorodnaya et al. | 310/270 |
| 4,275,324 | 6/1981 | Flick | 310/270 |
| 4,316,114 | 2/1982 | Zagorodnaya et al. | 310/270 |
| 4,430,589 | 2/1984 | Sakuyama et al. | 310/52 |
| 4,439,701 | 3/1984 | Okamoto et al. | 310/45 |
| 4,443,722 | 4/1984 | Hirao et al. | 310/45 |
| 4,462,152 | 7/1984 | Okamoto et al. | 29/598 |
| 4,482,829 | 11/1984 | Tardieu et al. | 310/105 |
| 4,667,125 | 5/1987 | Kaminski et al. | 310/214 |
| 4,843,271 | 6/1989 | Shah | 310/217 |

FOREIGN PATENT DOCUMENTS 0104503 8/1979 Japan ................................. 310/270

OTHER PUBLICATIONS

Hugin Industries, Inc. (formerly Multilam Corp.), brochure on Multilam Spring, two pages, Jun. 1985.

*Primary Examiner*—R. Skudy
*Attorney, Agent, or Firm*—Nixon & Vanderhye

[57] ABSTRACT

In a dynamoelectric generator, a low-resistance electrical contact is provided by a multilam or belleville spring mounted between the outer surface of the rotor body and an overlapping retaining ring. This contact forms a conductive current path for high-frequency eddy currents induced on the surface of the rotor and retaining rings at all operating speeds.

8 Claims, 2 Drawing Sheets

MULTILAM OR BELLEVILLE SPRING CONTACT FOR RETAINING RINGS ON DYNAMOELECTRIC MACHINE

This invention was made with U.S. Government support under a contract with the U.S. Navy. The federal government has certain rights in this invention.

FIELD OF INVENTION

This invention relates to an electrical contact for bridging high-frequency currents between the retaining rings and rotor of a dynamoelectric machine.

RELATED APPLICATIONS

This application relates to copending and concurrently filed application Ser. No. 07/628,898, filed Dec. 18, 1990, entitled "Cantilever Spring Contact for Retaining Rings on Dynamoelectric Machine" (atty ref. 839-63; client ref. 17GE-3391).

This application also relates to copending and application Ser. No. 07/522,037, filed May 11, 1990, entitled "Reducing Harmonic Losses in Dynamoelectric Machine Rotors."

BACKGROUND AND SUMMARY OF THE INVENTION

Generator rotors have a large diameter cylindrical body from which extends at both ends a smaller diameter shaft. The rotor body has a series of longitudinal slots cut deep into its outer circumference. In these slots are inserted field windings that extend the length of the rotor body. There are wedges in the slots that hold the windings in place against centrifugal forces exerted when the rotor rotates. These wedges are above the windings and may protrude radially outward of the outer circumferential surface of the rotor body.

The end turn portions of the windings extend axially out beyond each end of the rotor body. These end turns electrically connect the longitudinal section of a winding in one slot with a similar winding section in another slot. As the rotor spins, the end turns are thrust radially outward by centrifugal force. This radial movement of the end turns is confined by retaining rings that enclose the end turns and are placed over the ends of the rotor body. Centrifugal forces cause the end turns to press firmly against the inside surface of the retaining rings. In this way, the retaining rings hold the end turns in place during operation of the generator.

Retaining rings are usually attached to the ends of the rotor body by shrink fitting. The rim of one end of the retaining ring is shrink fitted tightly around a circumferential lip on the end of the rotor body. In addition, locking keys securely hold the retaining rings onto the rotor body to prevent axial movement of the rings. These keys fit in opposing grooves in the retaining ring and in both the rotor teeth and wedges. Without these keys, thermal expansion of the field coils and the retaining rings may cause the retaining rings to slide axially off the rotor.

In some applications, high frequency currents exist on the surface of the rotor body and retaining rings. For example, when the generator is used in conjunction with a load commutated inverter LCI), cycloconverter (CCV) or other non-linear load, eddy currents are induced on the surface of the rotor. These rotor eddy currents are the results of harmonics of the input and/or output currents of the LCI and CCV devices. The currents have high frequencies and, thus, primarily reside at and near the surface of the rotor and retaining rings.

Losses due to these eddy currents in the rotor result in undesirable $I^2R$ (Joulean) heating. Accordingly, low resistance current paths are needed to reduce eddy current losses and thus minimize heating. The rotor body and retaining rings, typically made of high strength steel alloys, are not themselves good electrical conductors. The relatively high electrical resistance of the retaining rings and rotor body to the eddy currents will cause high losses and heating. To avoid these losses, eddy shields cover the outer surfaces of the rotor body and retaining rings to provide a low resistance electrical path for surface eddy currents. The shields reduce losses of eddy currents and can prevent localized heating of the rotor body and retaining rings.

An eddy shield is commonly a thin copper layer applied to the outer surfaces of the rotor body and retaining rings. The shield can be a jacket or a cladding. In the alternative, an eddy current shield for the rotor can be provided by specially configured wedges made of conductive chromium-copper or other alloys that have wings that overhang the rotor teeth adjacent the wedge. These wedges are disclosed in the copending application entitled "Reducing Harmonic Losses in Dynamoelectric Machine Rotors" referenced above and incorporated by reference.

While eddy shields substantially reduce current losses, they do not reduce the magnitude of the eddy current. The current shields merely provide low resistance paths for the currents. Any interruption or point of high resistance in these current paths will cause additional loss and localized heating. It is desirable to provide a reliable low resistance electrical connection between the rotor body and retaining rings. As discussed below, prior couplings between rotors and retaining rings do not provide good electrical connections for high-frequency currents.

One example of a eddy current junction between the rotor and retaining ring is shown in U.S. Pat. No. 4,275,324. This patent discloses a radial extension on the wedge that rises to meet the eddy current shield on the retaining ring. The patent does not clearly disclose how the contact is made between the extension on the wedge and the eddy current shield to the retaining ring, or how the contact is maintained at all rotor operating speeds.

The present invention provides a reliable electrical contact for eddy currents from the rotor surface to the retaining ring. An electrical contact is provided between the surface of the rotor and the retaining rings at all operating speeds. This contact is a multilam or belleville spring in a groove mounted in the surface of the wedges and rotor teeth. The spring is biased against the inner surface of the retaining ring. This spring provides an electrical path for eddy currents.

It is an objective of this invention to provide a reliable electrical junction between a rotor and a retaining ring for high-frequency eddy currents. In particular, it is an object of this invention to provide such a junction by means of a multilam or belleville spring mounted between the outer surface of a wedge and the inner surface of the overlapping end of the retaining ring.

DETAILED DESCRIPTION OF THE DRAWINGS

Figure 1:
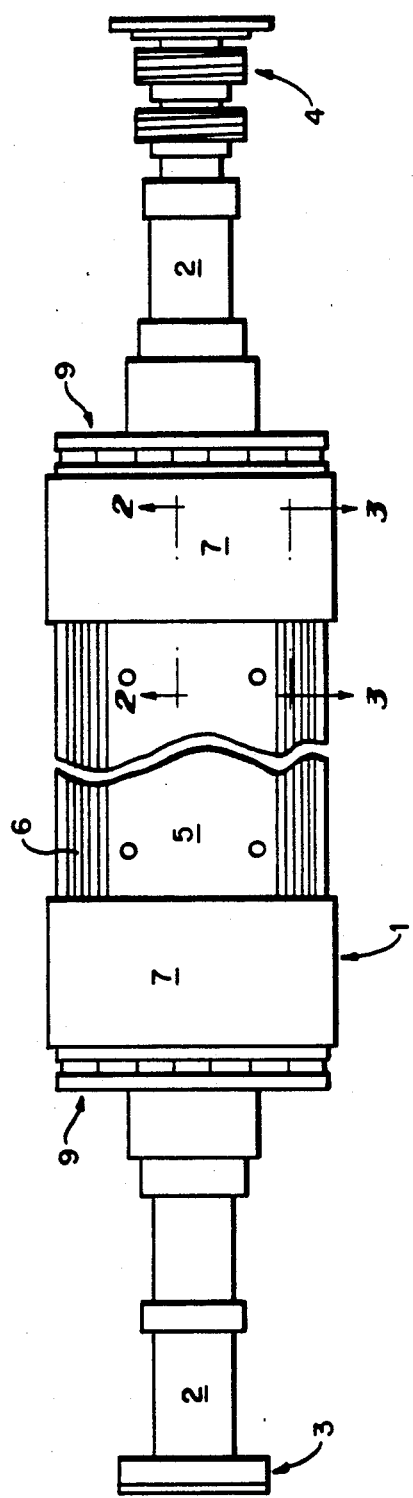
FIG. 1 prior art is a perspective view of a generator rotor having coil windings and retaining rings.

FIG. 1 illustrates a rotor 1 for a generator (or motor). The rotor has a shaft 2 that has a power turbine (or mechanical load) coupling 3 and is supported by bearings that are not shown. The rotor shaft also has a collector ring 4 that provides an electrical junction for the rotor field winding.

Figure 2:
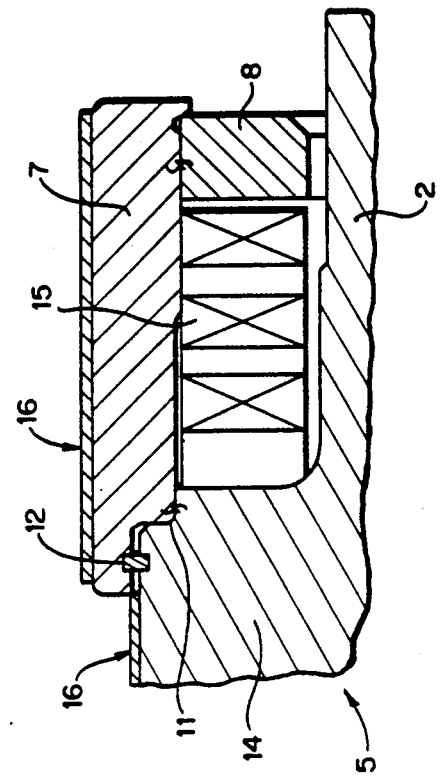
FIG. 2 is an axial cross section taken along line 2—2 of FIG. 1 prior art.

The rotor has a large diameter body 5 that holds the coil windings 6. This body has longitudinal slots in which the coil windings are mounted. The slots extend the length of the body. Annular retaining rings 7 cap both ends of the rotor body. The retaining rings are supported on one end by the body and on the other end by a centering ring 8 (FIG. 2). Adjacent the retaining rings are fans 9 that cool the retaining rings and other rotor components.

Figure 3:
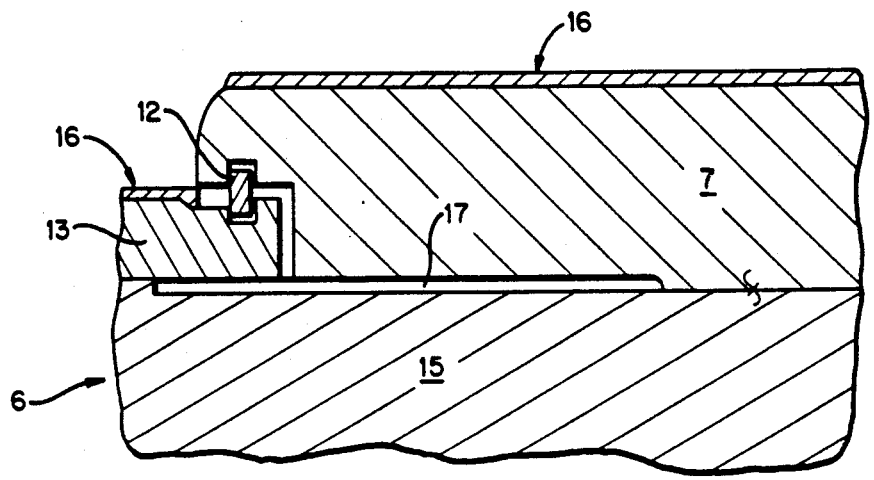
FIG. 3 is an axial cross section taken along line 3—3 of FIG. 1.

As shown in FIGS. 2 and 3, retaining rings slide over the end of the rotor body 5. The retaining ring is attached to a lip 11 on the end of the body by a shrink fit ($\varphi$) process. The retaining rings are also shrunk fit onto the centering rings 8. In addition, an annular locking ring 12 secures the retaining ring to the body. The locking ring engages grooves that extend circumferentially around the rotor and retaining rings. The groove in the rotor is cut in the teeth 14 of the rotor body and the wedges 13. The wedges 13 hold the coils in the slots and extend beyond the outside surface of the rotor body.

The end turns 15 on the coil windings are enclosed by the retaining rings 7. The end turns extend axially from the end of the rotor body. The end turns bend radially outward when subjected to the centrifugal forces arising from the rotating rotor. The retaining rings confine this radial movement of the end windings.

In the prior art, eddy current shields 16 covered the outer surfaces of the rotor body and retaining rings. The prior art did not provide a low resistance electrical junction between the rotor body and retaining ring. A finger amortisseur 17 provided an electrical connection between the wedge 13 and the retaining ring 7. The amortisseur is a copper insert that extends in axial slots in the underside of the wedge and the retaining ring. The amortisseur 17 is too far below the outer surface of the wedge and rotor body to conduct eddy currents. The current penetration depth (skin depth) of the eddy currents is inversely proportional to the square root of its frequency. The relatively high-frequency harmonic eddy currents do not penetrate the rotor to the depth of the bottom of the wedge and amortisseur. Accordingly, the amortisseur is not an effective current path for high frequency eddy currents.

In the prior art, electrical current could also be between the rotor and retaining ring through the shrink fit of the retaining ring on the lip 11 of the rotor. The lip 11 is below the outer surface of the rotor and below the skin depth of the eddy currents. Accordingly, the shrink fit between the rotor and retaining ring is below the surface eddy currents and does not effectively convey these currents.

Prior designs provided another current path through the locking key 12 between the rotor and retaining ring. The locking key is close to the surface of the rotor body and, thus, to the eddy currents. However, the key moves within the opposing grooves of the wedge and retaining ring. Accordingly, the electrical contact through the locking key is intermittent and inadequate to reliably conduct eddy currents.

Figure 4:
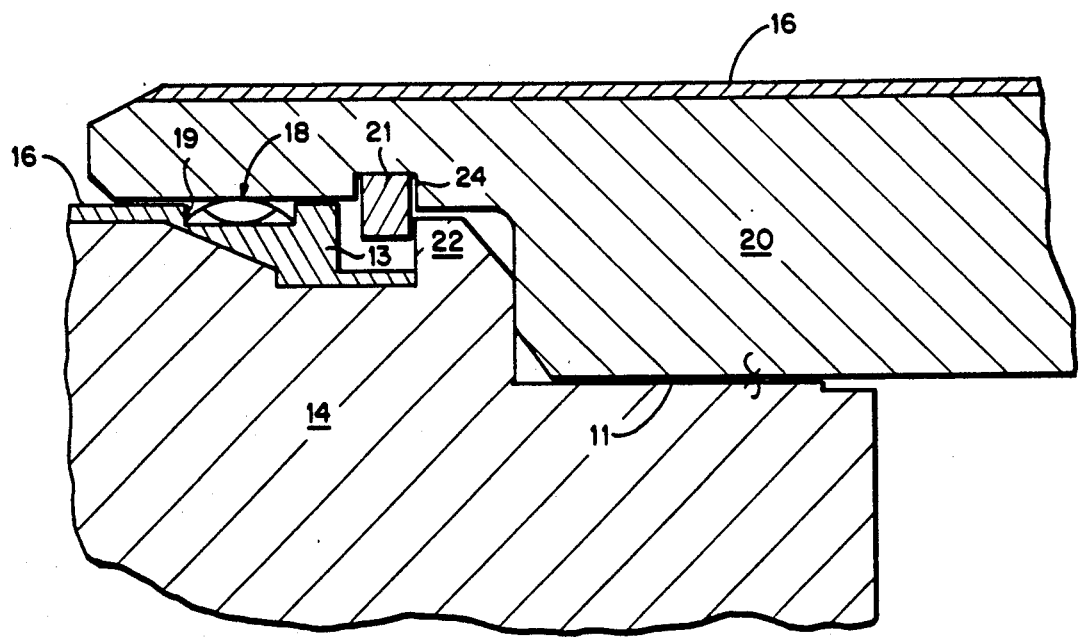
FIG. 4 is an enlarged view of an axial cross section taken along line 3—3 of FIG. 1.

FIG. 4 shows one embodiment of the present invention. A low-resistance eddy current path is provided by a conductive multilam or belleville spring 18 between the eddy current shield 16 on the surface of the wedge 13 and the retaining ring 20. The spring is inserted in a groove 19 in the wedge underneath the overlapping section of the retaining rings. The retaining ring is attached to a lip 11 on the end of the rotor body by a shrink fit process. The spring is in electrical contact with the retaining ring, the wedge and rotor surfaces. The spring could, alternately, be placed in a similar groove on the inner surface of the retaining ring.

An example of a multilam spring is disclosed in U.S. Pat. No. 3,453,587 entitled "Electrical Conductor" and issued to R. Neidecker on July 1, 1969. This annular metal ring fits in the annular gap between the rotor and retaining ring. Such rings are available from Hugin Industries, Inc., of Los Altos, Calif.

Currents in the eddy current shield 16 on the surface of the wedge pass through the spring 18 into the retaining ring 20. This spring conductor provides a low-resistance current path that avoids current losses and heating at the junction of the retaining rings and wedges. In addition, the spring can also form an electrical contact between the rotor teeth and the retaining rings.

The retaining ring 20 is secured onto the end of rotor by locking ring 21 that engages the lip of nose 22 on the end of each rotor tooth 14. There is an annular groove 24 in the inner surface of the retaining ring that aligns with the lip on the noses 22 of the rotor teeth when the retaining ring is completely on the rotor. This groove 24 extends circumferentially around the inner circumference of the retaining ring. While the retaining ring is hot and is being slid onto the end of the rotor, the locking ring 21 is compressed so that it does not extend radially beyond the top of the rotor teeth. When the groove 24 is aligned with the rotor teeth, the locking key expands into the groove and locks the retaining ring onto the end of the rotor body.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dynamoelectric machine comprising:
  a rotor body having a plurality of longitudinal rotor slots in its outer surface;
  electrically-conductive windings having longitudinal sections located in said rotor slots and end turn sections connecting said longitudinal sections at the axial end of said rotor body, said end turn sections extending axially out from the rotor body;
  wedges in said rotor slots above the longitudinal sections of said windings and confining these longitudinal sections in said slots;
  a retaining ring attached to an end of said rotor body, said retaining ring enclosing said end turn sections to restrain radial outward movement of said end turn sections, said retaining ring overlapping said wedges; and an electrically-conductive spring between an outer surface of said wedges and an overlapping portion of said retaining ring such that said spring is biased against the wedges and retaining ring.

2. A dynamoelectric machine as in claim 1 wherein said rotor body and said wedges comprise eddy current shields on their outer surfaces and said spring provides a conductive electrical path for facilitating eddy currents from the eddy current shields on the rotor body and wedges to the retaining ring at all operating speeds of the rotor body.

3. A dynamoelectric machine as in claim 2 wherein said retaining ring comprises an eddy current shield on its outer surface.

4. A dynamoelectric machine as in claim 1 wherein said spring is a multilam spring.

5. A dynamoelectric machine as in claim 1 wherein said spring is disposed in a groove in an outer surface of said wedges.

6. A dynamoelectric machine as in claim 1, wherein said spring is a belleville spring.

7. In a dynamoelectric machine comprising:
a cylindrical rotor body having a plurality of longitudinal rotor slots in its outer surface;
electrically-conductive windings having longitudinal sections in said rotor slots and end turns electrically coupling said longitudinal sections in a plurality of said slots, said end turns adjacent an axial end of said rotor body;
wedges in said said rotor slots above said windings, said wedges confining the longitudinal sections of said windings in their respective slots, said wedges having an eddy current shield on their outer surfaces;
a retaining ring secured to the axial end of said rotor body and enclosing said end turns, said retaining ring overlapping a portion of an outer surface of each of said wedges, said retaining ring having an eddy current shield on its outer surface, and
a multilam spring between the overlapping portion of said retaining ring and the eddy current shield of said wedges, said spring being disposed in a groove in said wedges and biased against an inside surface of said retaining rings, said spring providing an electrically-conductive connection for facilitating free-frequency current between the outer surface of each of said wedges and said retaining ring.

8. A dymamoelectric machine as in claim 6, wherein said spring is a belleville spring.

* * * * *